United States Patent [19]

Foster

[11] 4,099,143
[45] Jul. 4, 1978

[54] GAS RECIRCULATING STABILIZED LASER
[75] Inventor: Jack D. Foster, Los Altos, Calif.
[73] Assignee: Universal Laser Corp., Los Altos, Calif.
[21] Appl. No.: 759,460
[22] Filed: Jan. 14, 1977
[51] Int. Cl.² .............................................. H01S 3/086
[52] U.S. Cl. ........................... 331/94.5 C; 331/94.5 D
[58] Field of Search ...................... 331/94.5 C, 94.5 D, 331/94.5 G

[56] References Cited
U.S. PATENT DOCUMENTS

| | | | |
|---|---|---|---|
| 3,783,407 | 1/1974 | Mefferd et al. | 331/94.5 C |
| 3,987,373 | 10/1976 | Mohler | 331/94.5 C |
| 4,058,778 | 11/1977 | Fahlen et al. | 331/94.5 D |

Primary Examiner—William L. Sikes
Attorney, Agent, or Firm—Limbach, Limbach & Sutton

[57] ABSTRACT

A recirculating gas laser includes a gas-containing closed chamber having optically aligned mirrors adjacent the ends with a closed loop gas recirculation path, means for moving the gas around that path, and means for producing an electrical discharge in the gas, generally transversely of the optical axis. A heat exchanger for cooling the gas is interposed in the gas flow path, and means for supporting the mirrors extend longitudinally of the chamber and are positioned within the gas flow path to receive the cooled gases thereagainst, this support means being mounted to the chamber by other means which isolate the support from expansion and contraction of the chamber.

6 Claims, 3 Drawing Figures

U.S. Patent  July 4, 1978  4,099,143
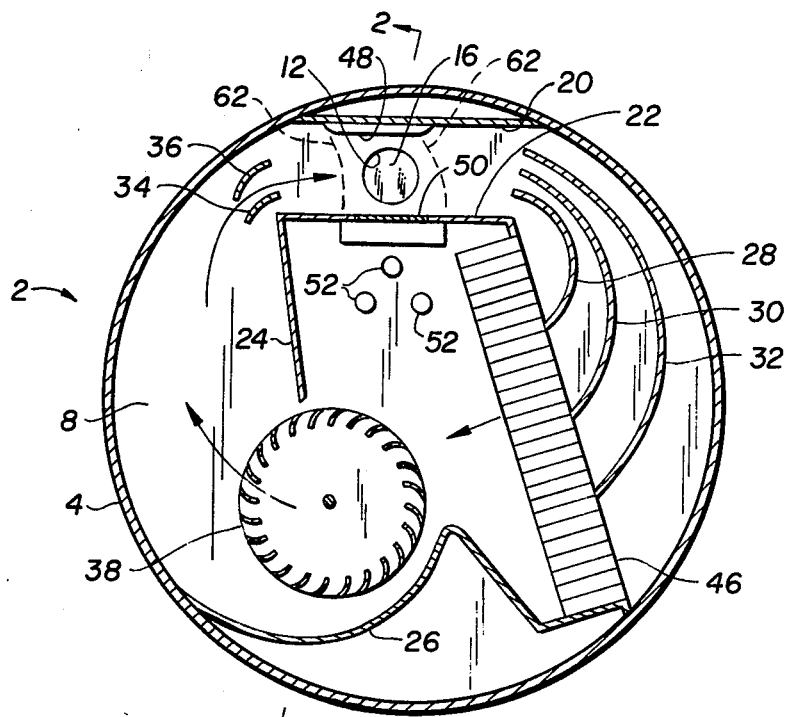
FIG._3.
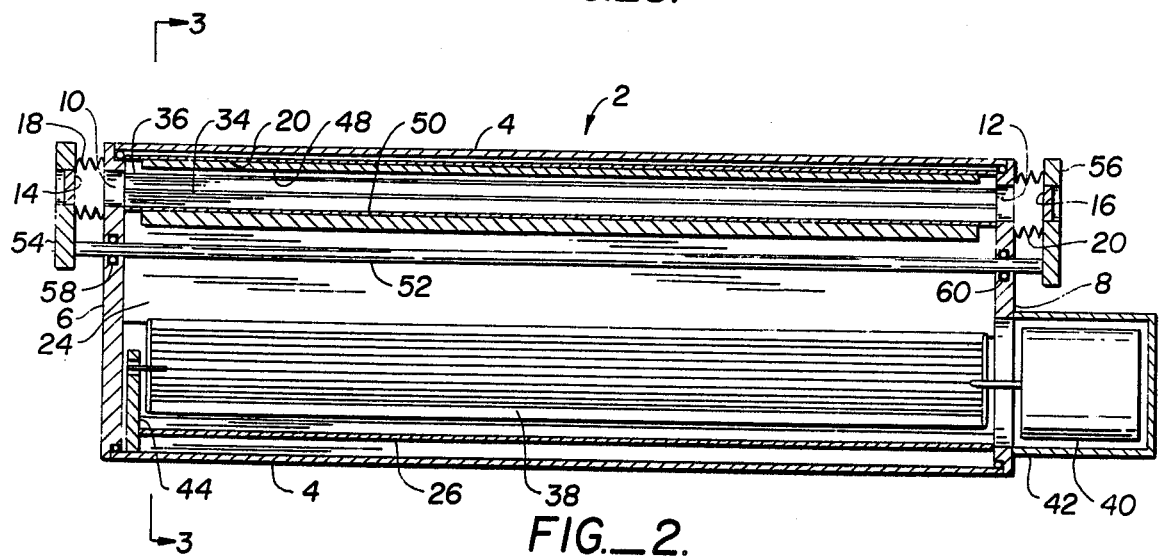
FIG._2.
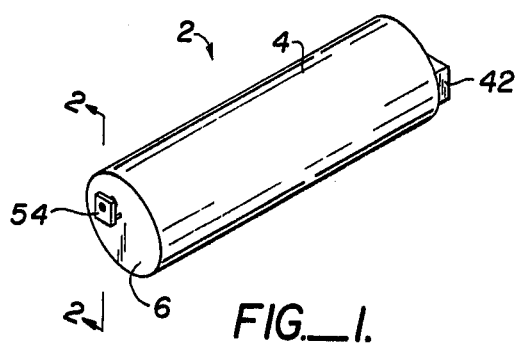
FIG._1.

GAS RECIRCULATING STABILIZED LASER

BACKGROUND OF THE INVENTION

This invention relates in general to high power, recirculating gas lasers.

Lasers of all types generally operate with rather low efficiency. Even the carbon dioxide ($CO_2$) laser, which is one of the most efficient, requires ten or more times greater input power than it provides output laser power. All of the waste heat generated by this inefficiency must be removed from the laser while maintaining the laser medium at a moderate temperature which is generally required for successful operation.

One satisfactory technque for achieving high power continuous gas laser operation is the use of a gas recirculation and cooling system. A glow discharge for pumping the laser is maintained in a plasma excitation region, from which the laser energy is extracted by a resonant optical cavity. The recirculation of the gas flow directs the hot gases through a heat exchanger where the gases are cooled, and the heat extracted is rejected to the outside atmosphere. From this heat exchanger the gas then flows through a blower which recirculates it back to the plasma excitation region, and so on.

The resonant optical cavity for a gas laser is formed by mirrors mounted on the ends of a structure in such an arrangement that light photons can be stored between the mirrors and can interact with the excited laser plasma. The output beam is typically obtained from a partially transmitting mirror in a stable resonator configuration, or from the light passing around the mirror in an unstable resonator configuration. In either case the mirrors must be maintained in extremely precise relative angular orientation and spacing to maintain a resonant cavity such as is necessary for constant laser output and for beam geometrical shape or mode quality.

The optical resonator structure for a high power laser must perform the extremely difficult task of maintaining the precise angular orientation of the mirrors while being situated very close to the plasma excitation region from which large amounts of heat are flowing. Because of thermal expansion, any non-uniform temperature change in the resonator, even over very long time periods, will change the laser output power and mode quality. Most high power gas lasers have experienced these problems because the extremely hot gases downstream of the plasma excitation region have not been sufficiently isolated from the resonator structure. Thus, these hot gases flowing over the resonator mirror supports have resulted in non-uniform thermal expansions in the resonant optical cavity, particularly in the mirror support structures.

SUMMARY OF THE INVENTION

In view of the foregoing it is an object of this invention to provide a high power recirculating gas laser having a stable output power level and laser beam mode over a long period of time. More particularly, it is an objective of this invention to provide such a laser with inexpensive means for maintaining the angular alignment of the laser optical resonant cavity mirrors over long time periods.

These and other objects of the invention are achieved by providing a recirculating gas laser having a closed gas-containing chamber with mirrors positioned adjacent longitudinal end portions thereof, these mirrors being mutually opposed and aligned along an optical axis to define a resonant laser cavity therebetween. The laser further includes a means defining a closed loop fluid path for recirculation of the gas, means for moving the gas in a predetermined direction along the fluid path, means for producing an electrical discharge in the gas in a direction extending generally transversely of the gas movement and generally transversely of the optical axis, and a heat exchanger interposed in the fluid path for cooling the gas. Means for supporting the opposed mirrors extend longitudinally of the chamber and are positioned within the fluid path to receive a portion of the heat exchanger cooled gas thereagainst prior to the gas being recirculated through the electric discharge. A structure is provided for mounting the mirror support means to the chamber while substantially isolating the support means from expansion and contraction of the chamber. By this structure, long term thermal uniformity of the mirror support means is provided.

BRIEF DESCRIPTION OF THE DRAWINGS

A preferred embodiment of the laser of this invention will be described in detail in which:

FIG. 1 is a perspective view of a laser according to this invention;

FIG. 2 is a side sectional view on a larger scale of the laser of FIG. 1; and

FIG. 3 is an end sectional view taken along line 3-3 of FIG. 2.

DESCRIPTION OF THE PREFERRED EMBODIMENT

A recirculating gas laser according to this invention is illustrated in the perspective view of FIG. 1 and in the sectional views of FIGS. 2 and 3. In general, the laser of this embodiment comprises a chamber 2 defined by an elongated tubular housing 4 having a pair of axially opposed end portions or members 6 and 8. The end portions 6 and 8 each have an aperture, the aperture in end portion 6 being denoted by reference numeral 10 and the aperture in end panel 8 being denoted by reference numeral 12. These apertures are axially aligned with one another. Adjacent the chamber end portions 6 and 8 and positioned longitudinally outwardly therefrom are the respective laser cavity end mirrors 14 and 16, which are aligned along an optical axis extending longitudinally of the chamber and through the apertures 10 and 12. These mirrors 14 and 16 serve to define the resonant optical cavity of this laser. Bellows 18 and 20 or other convenient means extend between the respective chamber end portions and their respective mirrors, for hermetically sealing each of the mirrors to its respective chamber, thus defining a closed chamber for the recirculating gas laser.

A suitable gas or gas mixture, conveniently carbon dioxide ($CO_2$), is contained within the closed chamber 2. This gas, or mixture of gases, is that which provides for the lasing action. Within the housing 2 is defined a closed loop fluid path for recirculation of the gas within the chamber. This path is defined by baffles 20, 22, 24, and 26 and turning vanes 28, 30, 32, 34, and 36. A transverse flow rotary fan 38, of the general type commonly described as a squirrel cage blower, is driven by motor 40 and serves as the means for moving the gas around the fluid path in a generally clockwise direction in the illustration of FIG. 1. To provide for complete hermetic sealing, the motor 40 conveniently is mounted within a sealed compartment 42 projecting out one end of the laser, and the bearing block mounting member 44 for the opposite end of the blower is positioned within the closed chamber. This blower 38 thus serves to move the gas around the fluid path as shown by the arrows, with the turning vanes 34 and 36 turning the flow in a direction to traverse the laser optical axis, and the turning vanes 28, 30 and 32 turning the gas to flow through a heat exchanger 46. For most efficient flow the fan and heat exchanger both preferably extend longitudinally within the chamber 2 over substantially the full length of that chamber.

To provide the electrical discharge necessary for the desired lasing action, cathode 48 is mounted adjacent baffle 20, generally opposite anode 50, which conveniently is mounted adjacent the surface of baffle 22. This cathode 48 and anode 50 are positioned on opposite sides of the optical path of the resonant cavity of the laser so that the electrical discharge produced thereby will extend generally transversely of that optical axis and generally transversely of the gas flow. The cathode 48 and anode 50 preferably extend over substantially the full longitudinal length of the chamber to provide the electrical discharge, and thus the laser pumping, over substantially the full length of the resonant optical cavity.

It is desirable to maintain precisely accurate spacing between the opposed end mirrors 14 and 16, despite expansion and contraction of the laser chamber 2. Accordingly, mirror supporting means are provided, suitably in the form of a plurality of rods 52 extending longitudinally of the laser chamber 2 and projecting outwardly through the end portions 6 and 8 and brackets 54 and 56 attaching the mirrors 14 and 16 to those longitudinally extending members 52. To isolate this mirror supporting structure from the thermal expansion and contraction of the chamber 2 while providing for a gas tight hermetic seal around the members 52 projecting through the end portion of the chamber, suitable means such as O-rings 58 and 60 are provided between the support members 52 and the apertures in the chamber end portions through which they project. Thus, the mirror supporting structure may be isolated from longitudinal expansion and contraction of the laser chamber 2.

By virtue of the structure described above, the manner of operation of the laser may be seen to be as follows. The gas in the laser is driven by the fan 38 around the fluid path and is turned by vanes 34 and 36 into the plasma excitation region indicated by the broken lines 62 extending between anode 48 and cathode 50. A glow discharge between the cathode and anode, which extends transversely of the direction of gas flow produces the excited plasma and inverts the energy states in the gas so that lasing occurs and a beam of coherent light is generated in the well known manner in the optical cavity between mirrors 14 and 16. The cathode 48 is connected to the negative terminal of an external power supply (not shown) with the anode connected to the positive side of such power supply. After passing through the plasma excitation region the plasma recombines into a hot gas which flows through the channel formed by baffles 20 and 22. This flow is then turned by vanes 28, 30 and 32 and directed into the heat exchanger 46, which may be of conventional design, where much of the heat generated by the plasma is removed from the gas. The cooled gas is then drawn from the heat exchanger back into the fan 38 for recirculation. The longitudinally extending mirror supports 52 are placed in the portion of the chamber defined by the baffles 22, 24 and 26 and are thus isolated from the hot plasma region and received the recirculating gas only after it has been cooled by passage through the heat exchanger 46 and prior to its recirculation through the electric discharge in the plasma region. Thus, by this structure, the mirror support members 52 are protected from the thermal expansion effects of the plasma heated gas, so that the tendency for thermal expansion of those support members 52 is significantly reduced from that of the structures of prior art recirculating gas lasers. Accordingly, this arrangement provides for enhanced stabilization of the laser output power level and of the laser beam mode over a long period of time.

While the foregoing describes one preferred embodiment of the recirculating gas laser of this invention, numerous variations and modifications of such structure, all within the scope of this invention, will readily occur to those skilled in the art. Accordingly, the foregoing description is to be considered only as illustrative of the principles of the invention and not as limitative thereof. The scope of this invention is to be defined solely by the claims appended hereto.

What is claimed is:

1. A recirculating gas laser comprising
   a closed chamber containing a gas and having mirror means positioned adjacent longitudinal end portions thereof, said mirror means being mutually opposed and aligned along an optical axis to define the resonant laser cavity therebetween;
   means defining a closed loop fluid path for recirculation of said gas within said chamber, a portion of said path extending transversely of said optical axis;
   means for moving said gas in a predetermined direction along said fluid path;
   means for producing an electrical discharge in said gas in a direction extending generally transversely of said gas movement and extending generally transversely of said optical axis;
   heat exchanger means interposed in said fluid path, whereby the gas may be cooled after being heated by passage through the electric discharge;
   means for supporting said opposed mirrors, at least a portion of said mirror support means extending longitudinally of said chamber and being positioned within a portion of said fluid path which receives said heat exchanger-cooled gas prior to said gas being recirculated through said electric discharge; and
   means for mounting said mirror support means to said chamber while substantially isolating said support means from expansion and contraction of said chamber.

2. A laser according to claim 1 wherein said heat exchanger means is configured to extend longitudinally within said chamber over substantially the full length of said chamber.

3. A laser according to claim 1 wherein said gas moving means comprises a transverse flow rotary fan positioned generally parallel to said heat exchanger means.

4. A laser according to claim 3 wherein both said fan and said heat exchanger means extend longitudinally within said chamber over substantially the full length of said chamber.

5. A laser according to claim 1 wherein said chamber end portions each have an aperture therethrough aligned with said optical axis, wherein said mirror support means comprise at least one member extending longitudinally of said chamber and extending through said chamber end portions with said mirror means attached thereto longitudinally outwardly of said chamber end portions, and wherein said laser further comprises means surrounding each said end portion aperture for hermetically sealing each said mirror means to its respective chamber end portion.

6. A recirculating gas laser comprising
   a chamber containing a gas and comprising an elongated tubular housing having a pair of axially opposed end portions each having an aperture therethrough, said apertures being mutually axially aligned;
   mutually opposed mirror means positioned adjacent each said chamber end portion longitudinally outwardly therefrom and aligned along an optical axis extending longitudinally of said chamber and through said end portion apertures, said mirror means defining the resonant laser cavity therebetween;
   means surrounding each said chamber end portion aperture and extending between each said chamber end portion and its respective mirror means for hermetically sealing each said mirror means to its respective chamber end portion;
   means defining a closed loop fluid path extending generally circumferentially within said chamber and over substantially the full longitudinal extent of said chamber for recirculation of said gas within said chamber, a portion of said path extending transversely of said optical axis;
   means for moving said gas in a predetermined direction along said fluid path;
   means for producing an electrical discharge in said gas across said optical axis and in a direction extending generally transversely of said direction of gas movement;
   heat exchanger means interposed at a predetermined location in said fluid path and extending along substantially the full longitudinal extent of said chamber at said location to receive said recirculating gas after it has passed said electrical discharge producing means, whereby the gas may be cooled prior to its return to the discharge producing means;
   mirror support means extending longitudinally of said chamber between said opposed mirrors and being positioned within said fluid path on the downstream side of said heat exchanger between said heat exchanger and said electric discharge means, whereby the mirror support means may receive a portion of the cooled gas thereagainst prior to the gas being recirculated through the electric discharge; and
   means for mounting said mirror support means to said chamber while substantially isolating said mirror support means from expansion and contraction of said chamber.

* * * * *